United States Patent [19]
Krawack

[11] 4,154,749
[45] May 15, 1979

[54] METHOD FOR CATALYTIC REARRANGEMENT OF 1,2-DIGLYCERIDES INTO 1,3-DIGLYCERIDES

[75] Inventor: Borge Krawack, Hojbjerg, Denmark

[73] Assignee: Aarjis Poefabrik A/S, Aarhus, Denmark

[21] Appl. No.: 814,083

[22] Filed: Jul. 8, 1977

[51] Int. Cl.[2] .......................... C09F 7/08; C11C 3/14; C11C 3/02

[52] U.S. Cl. ............................... 260/405.6; 260/410.7

[58] Field of Search ........................... 260/405.6, 410.7

[56] References Cited

U.S. PATENT DOCUMENTS

| | | | |
|---|---|---|---|
| 3,012,890 | 12/1961 | Dutton et al. | 260/410.7 |
| 3,845,087 | 10/1974 | de Groot | 260/405.6 |
| 4,018,806 | 4/1977 | Wyness et al. | 260/410.7 |

*Primary Examiner*—John Niebling
*Attorney, Agent, or Firm*—Lewis H. Eslinger

[57] ABSTRACT

A method is disclosed for the catalytic rearrangement of 1,2-diglycerides into 1,3-diglygerides by storage at raised temperature, in a solid state, until the ratio of 1,2- to 1,3-diglycerides is less than 1:4.

2 Claims, No Drawings

METHOD FOR CATALYTIC REARRANGEMENT OF 1,2-DIGLYCERIDES INTO 1,3-DIGLYCERIDES

The present invention relates to a method for catalytic rearrangement of 1,2-diglycerides into 1,3-diglycerides by storage at raised temperature, but in solid state, until the ratio of 1,2- to 1,3-diglycerides is less than 1:4.

The rearrangement of 1,2-diglycerides into 1,3-diglycerides is described in British patent No. 1,369,438 and the equivalent Danish published application No. 132,886. Said patent describes a method in which mixtures containing 1,2-diglycerides are heated and kept in solid state for up to 7 days so that the weight ratio of 1,2-diglycerides to 1,3-diglycerides becomes less than 1:6.

According to the examples of said patent, most — and perhaps all — of the products in which the rearrangement occurs are prepared by the process described in Belgian patent No. 763,889 which is the equivalent of Danish patent No. 127,811. In said patent fatty acid esters of glycidol are treated with fatty acids while onium compounds, preferably quaternary ammonium compounds, catalyze the reaction. It can be difficult to completely remove these catalysts from the reaction product, and it is uncertain whether the permission of the health authorities can be obtained for using the products in nutrients and stimulants, as stated in Danish published patent application No. 132,882.

It has now been found that the rearrangement proceeds only very slowly in the mixtures of partial glycerides prepared on a large technical scale by esterification of glycerol having less than 3 moles of fatty acids or by trans-esterification of triglycerides with glycerol.

Said technical products are mixtures of mono-, di- and triglycerides, and the reactions for their preparation may be performed so that the ratio of the constituent components may be varied within very wide limits.

Mixtures having maximum monoglyceride content are of specific importance. They consist of about 40% monoglyceride, about 50% diglyceride and about 10% triglyceride. The diglycerides will most frequently consist of the equilibrium mixture having about 60% of 1,3-diglyceride and about 40% of 1,2-diglyceride. The acids forming part of these glycerides are normally fatty acids having from 12 to 22 carbon atoms, especially stearic acid and palmitic acid.

These technical glyceride mixtures are extensively used as emulsifying agents in the food and stimulant industries, and they also serve as starting materials for the preparation of monoglycerides by molecular distillation. Also these products are used in the food and stimulant industries.

It has now surprisingly been found that the 1,2-diglycerides in mixtures of partial glycerides can be rearranged to 1,3-diglycerides by storage for a few days at raised temperature, but in solid state, when basic alkali metal compounds are used as catalysts. In accordance herewith the method according to the invention is specific in that during the rearrangement the mixture contains catalyst consisting of basic alkali metal compounds in amounts of at least 0.01% by weight calculated as sodium.

The basic alkali metal compounds may, for instance, be alkali metal hydroxide or soap. Also alkali metal can be used, and a mixture of sodium and potassium with a melting point lower than 60° C. is suitable. In principle, alkali metal alcoholates are applicable too, but this will result in the formation of the corresponding alcohol-fatty acid esters which may be difficult to remove from the reaction product.

The rearrangement takes place at a temperature between room temperature (about 25° C.) and the initial melting point of the glyceride mixture, preferably between 40° C. and the initial melting point of the mixture.

After the rearrangement the 1,3-diglycerides can be isolated by fractionation using hexane or acetone as solvent, and as side product there is obtained a fraction with higher monoglyceride content than the starting material, and said fraction can be used directly as emulsifying agent in the food and stimulant industries, or the fraction may be subjected to molecular distillation for the preparation of technical monoglycerides with a higher yield than obtained with the previously used starting materials.

The formed 1,3-diglycerides can be esterified in a known manner with fatty acids for the preparation of desired triglycerides. Especially when esterifying 1,3-diglycerides containing stearic acid and palmitic acid with oleic acid, triglycerides of the same type as in cocoa butter are obtained.

The method according to the invention will be illustrated in greater detail by the following examples, of which examples 1 and 4 are comparative examples. It should be noted that the test to determine 1,2- and 1,3-diglycerides gives the ratio between them with a relative uncertainty of 10%. All percentages in the examples are based on weight.

EXAMPLE 1

A commercial monoglyceride intended for use as emulsifying agent in the food industry was prepared by trans-esterification of fully hydrogenated soybean oil with glycerol. The sample contained 42% of monoglyceride and 0.02% of soap, and the ratio of 1,2- to 1,3-diglycerides was 42:52. The powdered sample was stored at 46° C., and after 4, 8 and 12 days' storage the ratio of 1,2- to 1,3-diglycerides was 40:60, 39:61 and 36:64, respectively.

The rearrangement which has occurred is unimportant to the recovery of 1,3-diglycerides.

EXAMPLE 2

To a melted sample of the same type as used in Example 1 was added so much sodium hydroxide solution that the soap content was 0.8% corresponding to a sodium content of 0.062%, after which the sample was vacuum dried and made into powder. The ratio of 1,2- to 1,3-diglycerides was then 34:66. After storage at 46° C. for 4 and 12 days the ratio of 1,2- to 1,3-diglycerides was 19:81 and 4:96, respectively.

EXAMPLE 3

A sample of commercial monoglyceride containing 0.6% of soap corresponding to 0.046% sodium was stored at 46° C. for 12 days. Thereby the ratio of 1,2- to 1,3-diglycerides decreased from 37:63 to 14:86.

EXAMPLE 4

A sample of the same type as used in Example 3 was washed with a small amount of citric acid solution, dried and filtered. This reduced the soap content to 0. By storage at 46° C. for 15 days the ratio of 1,2- to 1,3-diglycerides decreased from 44:58 to 39:51, that is without technical importance.

EXAMPLE 5

A sample of the same type as used in Example 3 was admixed with sodium hydroxide solution and vacuum dried. The sample then contained 1.8% of soap corresponding to 0.14% sodium. By storage at 46° C. the ratio of 1,2- to 1,3-diglycerides decreased from 43:57 to 29:71 and 4:96 after 4 and 12 days, respectively.

What I claim:

1. A method for catalytic rearrangement of 1,2-diglycerides to 1,3-diglycerides by storage at raised temperature, but in solid state, until the ratio of 1,2- to 1,3-diglycerides is less than 1:4, wherein during the rearrangement the mixture contains a catalyst consisting of a basic alkali metal compound in an amount of at least 0.01% by weight calculated on the basis of sodium as a standard measure, said basic alkali metal compound being selected from the group consisting of (1) alkali metal soaps and (2) alkali metals, alkali metal alcoholates, alkali metal hydroxides, alkali metal carbonates and mixtures thereof in amounts that will react completely with the mixture to produce soap.

2. A method according to claim 1, wherein the heating is continued until the ratio of 1,2- to 1,3-diglycerides is less than 1:20.

* * * * *

UNITED STATES PATENT AND TRADEMARK OFFICE
CERTIFICATE OF CORRECTION

PATENT NO. : 4,154,749

DATED : May 15, 1979

INVENTOR(S) : BORGE KRAWACK

It is certified that error appears in the above-identified patent and that said Letters Patent are hereby corrected as shown below:

On the front page:

The assignee should be changed from "Aarjis Poefabrik A/S" to --Aarhus Oliefabrik A/S--.

In the Abstract:

Line 2, "1,3-diglygerides" should be changed to --1,3-diglycerides--.

Signed and Sealed this

*Twenty-fifth* Day of *March 1980*

[SEAL]

*Attest:*

SIDNEY A. DIAMOND

*Attesting Officer* *Commissioner of Patents and Trademarks*